Patented June 23, 1931

1,811,487

UNITED STATES PATENT OFFICE

ELMER C. BELDING, OF WHITTIER, CALIFORNIA, ASSIGNOR TO NATIONAL TOOL AND METALS, INCORPORATED, OF TORRANCE, CALIFORNIA, A CORPORATION OF CALIFORNIA

HARD FACING ALLOY

No Drawing.   Application filed April 16, 1929.   Serial No. 355,662.

This invention relates to a hard facing alloy which is adapted to be placed upon the cutting edges or surfaces of tools, bearing surfaces, or the like, for the purpose of materially increasing the useful life of the surfaces so treated and also to enable tools, or the like, to penetrate harder substances than would be possible with the ordinary metal of which the tool is made.

My hard facing alloy is particularly useful when placed upon drilling bits used in the drilling of oil wells or upon the cutting edges of reamers, core bits, or other similar articles or devices.

My alloy consists of a tantalum base to which molybdenum and tungsten are added. This alloy consists of approximately fifty-five per cent tantalum, more or less, four per cent molybdenum, and forty-one per cent tungsten, more or less. These three metals are mixed dry in the proportions stated and are then placed in a carbon crucible and heated under the electric arc until the metal is in a molten condition.

After the metal has set somewhat the crucible is quenched in water in order to shatter it and the alloy is then allowed to completely cool.

After the cooling the alloy is crushed under a hammer into small pieces or it may be rolled if desired.

The small pieces of alloy are then inserted or placed upon the cutting edge or surface of the tool, or the like, by means of the electric arc or oxy-acetylene flame.

Having described my invention, I claim:

1. A hard facing alloy comprising fifty-five per cent tantalum, four per cent molybdenum, forty-one per cent tungsten.

2. The method of forming a hard facing alloy comprising mixing fifty-five per cent tantalum, four per cent molybdenum, forty-one per cent tungsten, said tantalum, molybdenum and tungsten being mixed together in a dry state, then heating said mixture until the metals are in a molten condition, then cooling the alloy, and then breaking the mass into small particles.

In testimony whereof, I affix my signature.

ELMER C. BELDING.